July 7, 1925. 1,544,895
W. FELTON ET AL
APPARATUS FOR MAKING YARN RUGS AND SUCH LIKE
Filed July 9, 1923 8 Sheets-Sheet 1

Inventors,
William Felton
Charles Willber
ner Ferdinand Brooker Borchardt
Attorney.

July 7, 1925.                                                      1,544,895
W. FELTON ET AL
APPARATUS FOR MAKING YARN RUGS AND SUCH LIKE
Filed July 9, 1923                         8 Sheets-Sheet 2
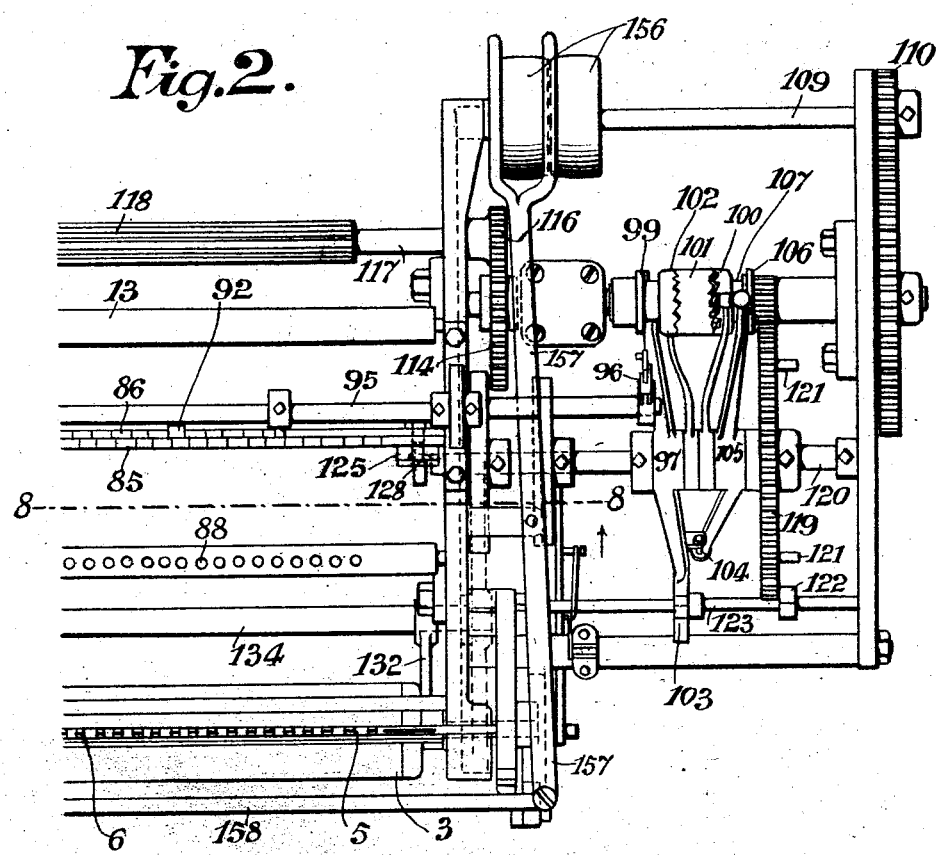
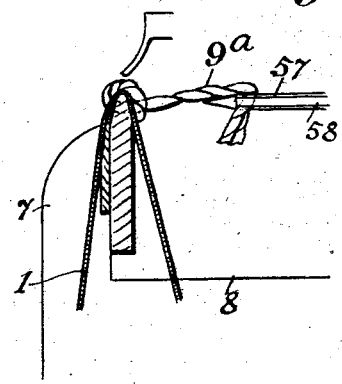
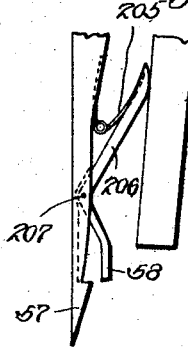
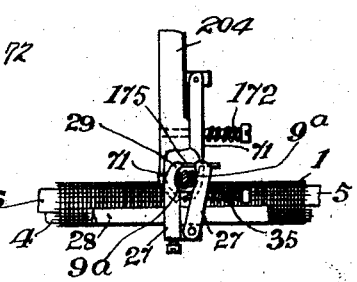

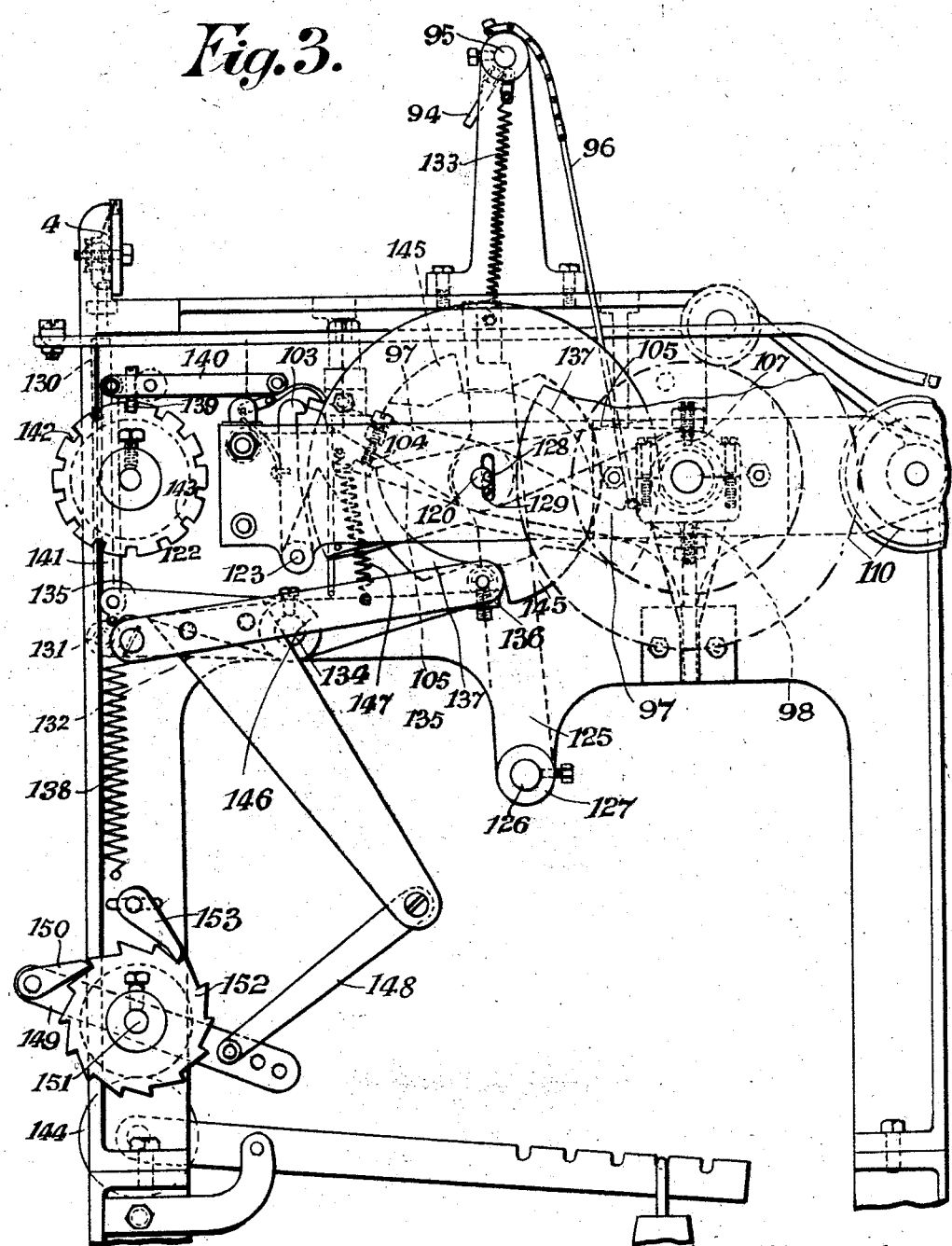

July 7, 1925.

W. FELTON ET AL 1,544,895

APPARATUS FOR MAKING YARN RUGS AND SUCH LIKE

Filed July 9, 1923

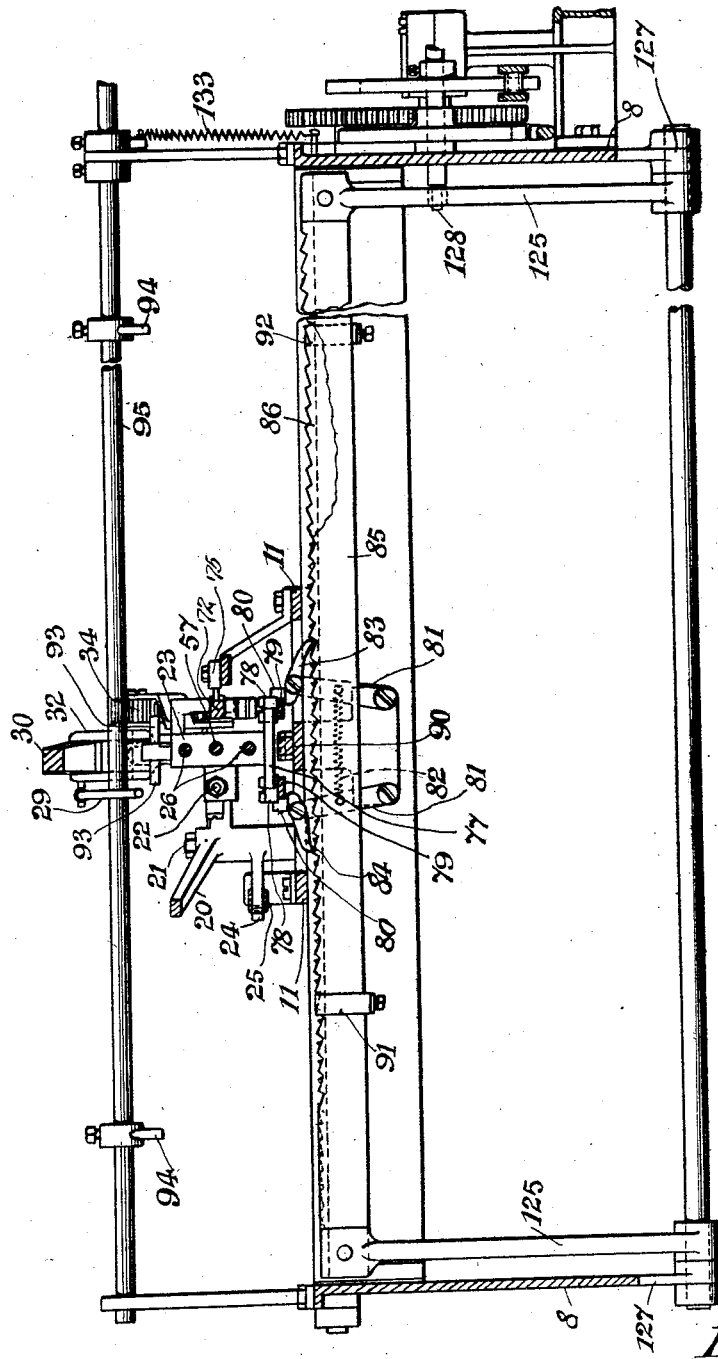

July 7, 1925.
W. FELTON ET AL
1,544,895
APPARATUS FOR MAKING YARN RUGS AND SUCH LIKE
Filed July 9, 1923      8 Sheets-Sheet 8
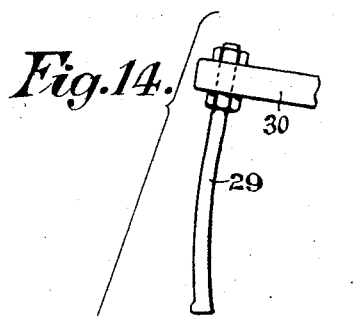
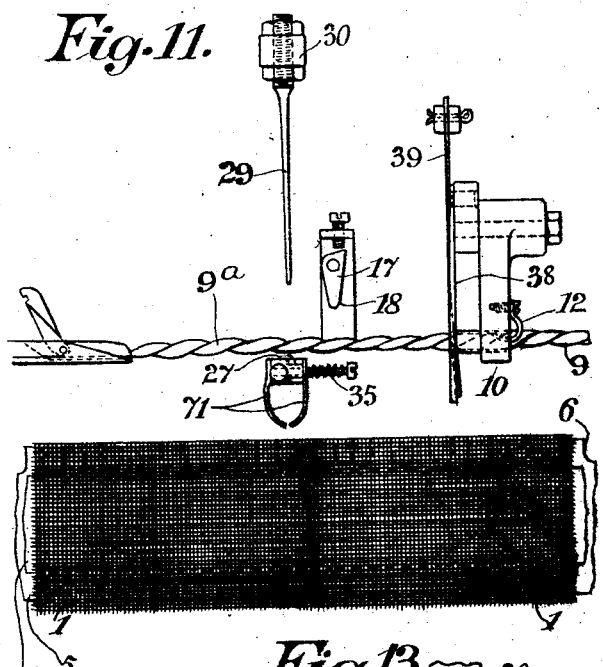
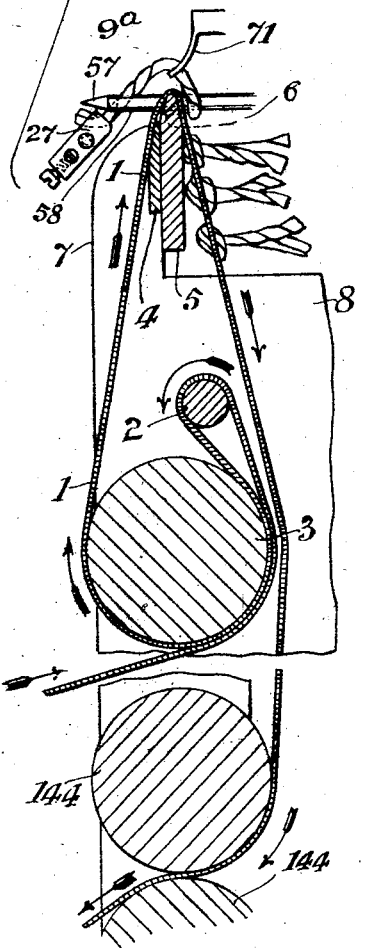
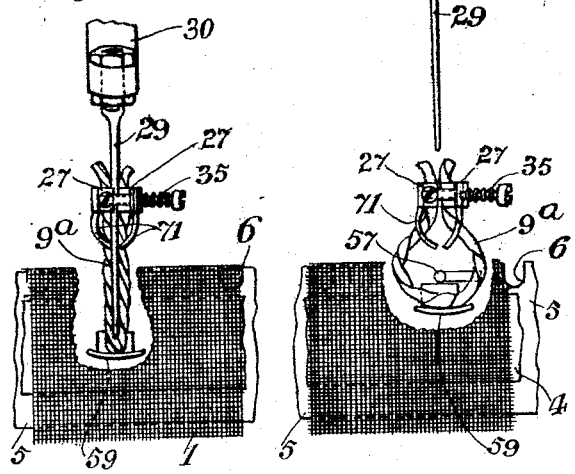
Inventors
William Felton
Charles Willber
per Ferdinand Broker Bernhardt
Attorney.

Patented July 7, 1925.

1,544,895

UNITED STATES PATENT OFFICE.

WILLIAM FELTON, OF RADCLIFFE, AND CHARLES WILLBER, OF PENDLETON, ENGLAND.

APPARATUS FOR MAKING YARN RUGS AND SUCH LIKE.

Application filed July 9, 1923. Serial No. 650,261.

*To all whom it may concern:*

Be it known that we, WILLIAM FELTON and CHARLES WILLBER, both British subjects, residing at Radcliffe and Pendleton, respectively, in the county of Lancaster, England, have invented certain new and useful Improvements in Apparatus for Making Yarn Rugs and Such like, of which the following is a specification.

This invention relates to apparatus for making rugs, mats and such like by mechanism from cabled or other yarn or the like inserted and looped or knotted into canvas or its equivalent and whereby the yarn or the like is fixed in the canvas and becomes as it were a pile.

Such rugs are at present made by hand using a hafted needle having two gripping elements one of which is pivoted and movable in known manner.

The object of our invention is to provide a machine for the indicated purpose whereby such rugs or mats can be produced by automatic mechanism on the supply of canvas and yarn to the machine.

We attain this object by the mechanism illustrated in the accompanying eight sheets of drawings, in which:—

Figure 1 is a plan view of the left hand portion of a machine for making yarn rugs and such like.

Figure 2 is a plan view of the right hand portion of the same machine.

Figure 3 is an elevation of a portion of the machine thereof drawn to a larger scale than Figures 1 and 2.

Figure 8 is a view in vertical section on line 8—8 of Figure 1 regarded in the direction of the arrow.

Figure 9 is a detached plan view drawn to a larger scale than the preceding figures, and illustrates a modification in a constructional detail.

Figure 10 is a detached end view drawn to the same scale as Figure 9, and illustrates a modification in constructional detail.

Figures 11 to 13 are detached front views and

Figures 14 and 15 are detached end views drawn to a larger scale than the other figures and illustrate the action of the machine in cutting the yarn and attaching it to the backing.

Figure 16 is a detached plan view drawn to the same scale as Figures 1 to 15, and illustrates a detail.

Figure 17 is a detached plan view illustrating a constructional detail.

Figure 1:
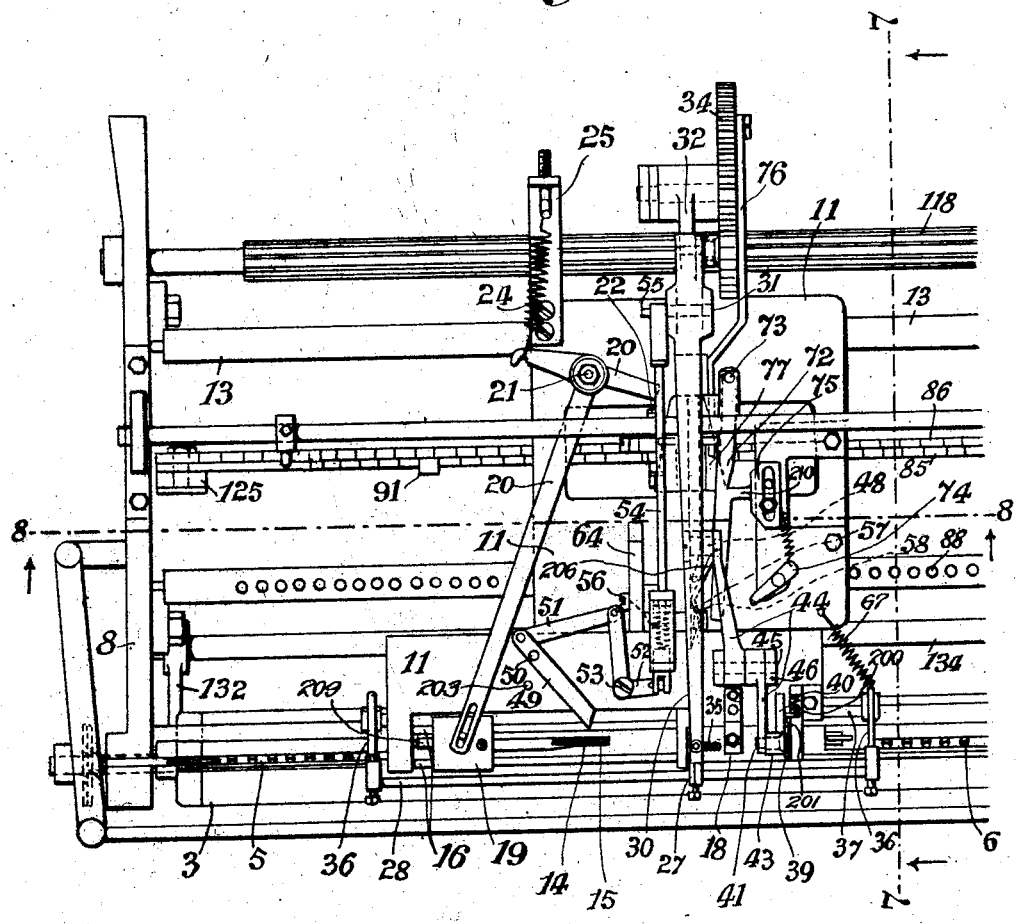
Figure 4:
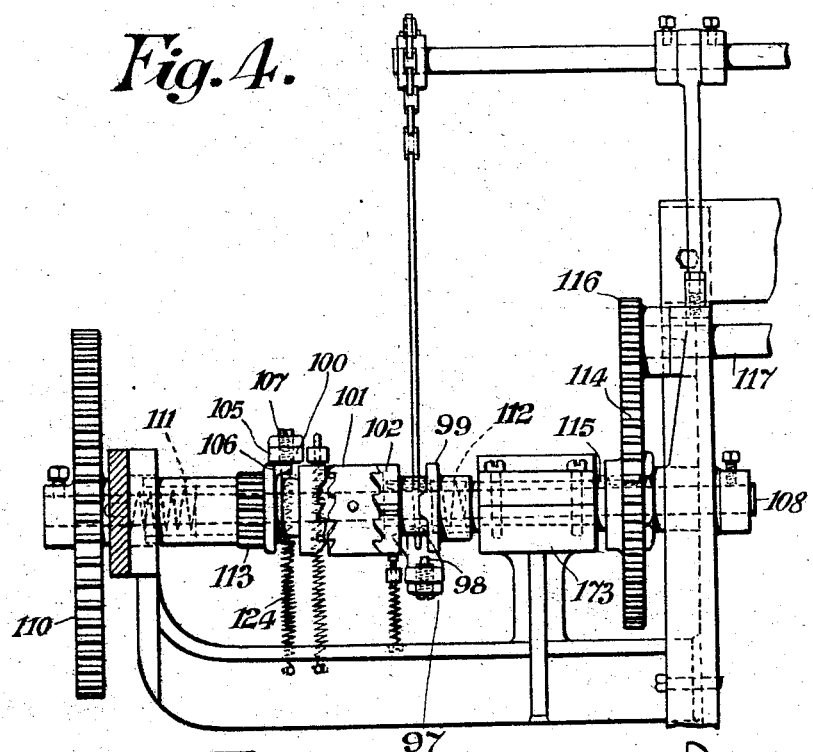
Figure 4 is a detached rear elevation of a portion of the machine, drawn to the same scale as Figure 3.

Referring to the drawings, in the construction illustrated therein, the supply of canvas 1, Figures 11 to 15, or other backing material is carried in any suitable way. For example a roll of canvas may be laid on supporting rolls (not shown) and led upwards over a bar 2 and then down over a sand or like roller 3 and upwards over a bar 4 capable of slight vertical movements when required for a purpose to be explained. In addition we direct the canvas 1 over a notched bar 5 provided with gaps 6 or notches the pitch of the gaps 6 corresponding with the pitch of the yarn insertions and the bar 5 may be bolted to uprights 7 from the main frame ends 8.

Figure 6:
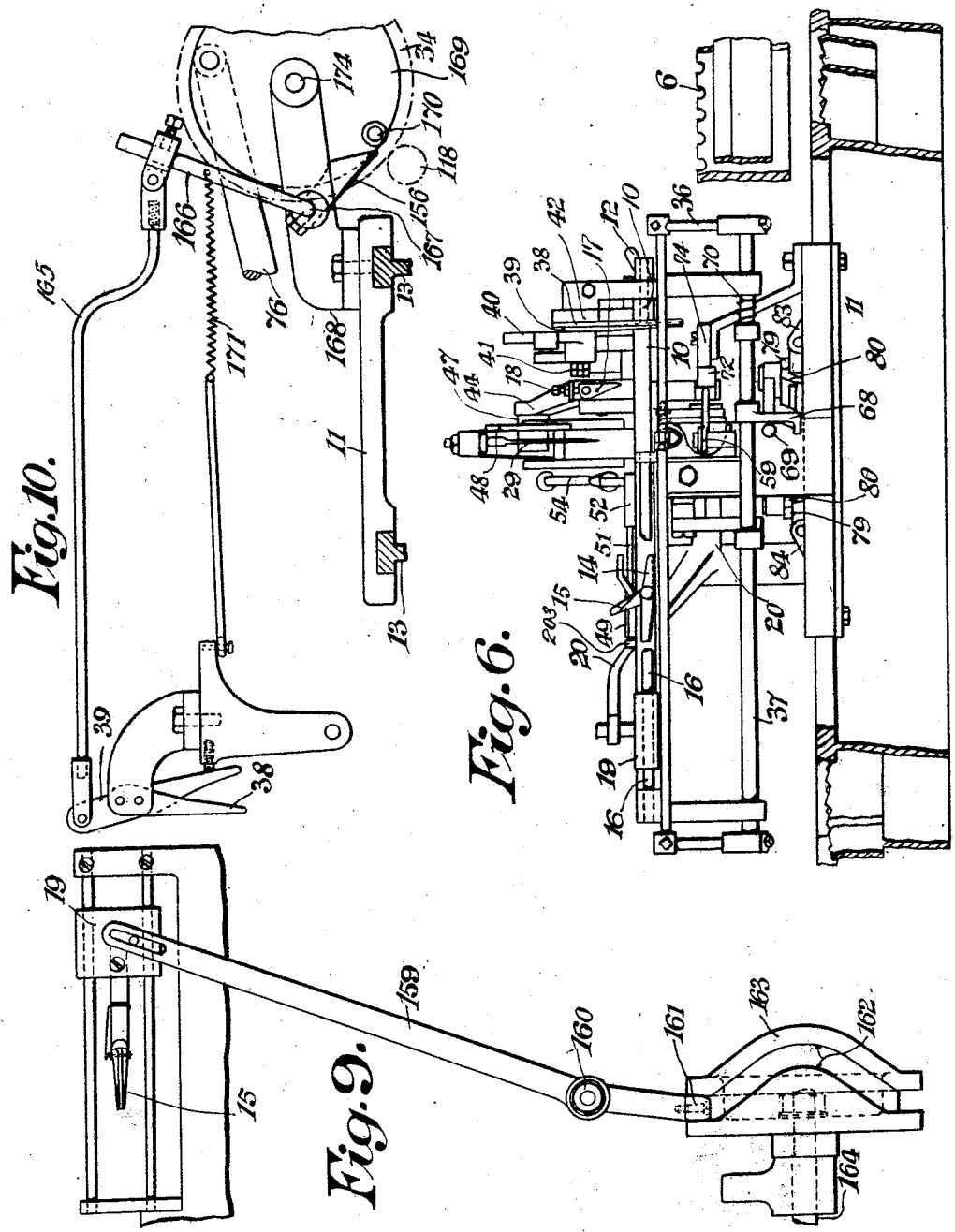
Figure 6 is a detached front elevation of another portion of the machine.
Figure 7:
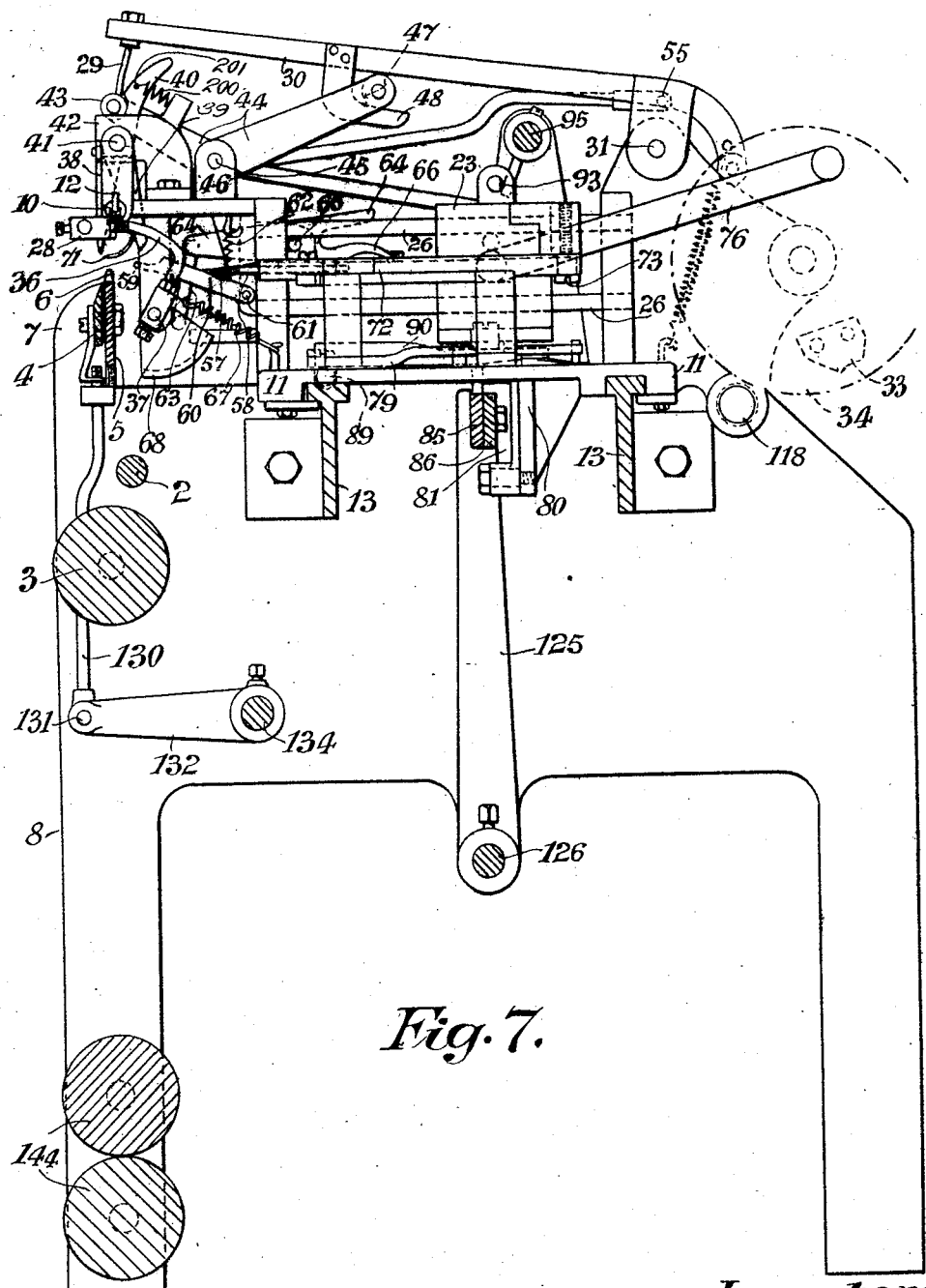
Figure 7 is a view in vertical section on line 7—7 of Figure 1 regarded in the direction of the arrow, drawn to the same scale as Figure 2.

The yarn 9 to be inserted is led from a bobbin (not shown) or other source of supply and directed through a suitable yarn guide or guides (not shown) to a tube or sleeve 10 mounted on a slide or carriage 11, the tube or sleeve 10 being adjustable or other provision made to govern its position. A device, such as for example a spring 12, Figures 6, 7 and 11 is provided in connection with the tube or sleeve 10 to prevent the yarn when inserted in the tube or sleeve 10 from being pulled backwards. The carriage 11 slides on guide rails 13 bolted to the frame ends 8.

Presuming the yarn to be in position in the tube or sleeve 10 and the disposition of the mechanism ready for inserting a loop through one of the notches 6 in the bar 5, then the first operation is that of drawing a length of yarn 9 longitudinally and of the correct length to produce a loop. This is done by a needle 14, 15 which is advanced upon and guided by slide bars 16 and consists of a fixed jaw 14 and a pivoted jaw 15 acted on by spring means which tend to close the pivoted jaw 15. When the needle 14, 15 advances the pivoted jaw 15 is opened by a trip cam 17 suitably supported on a bracket 18 and the jaw 15 is opened against the action of said spring means. The opened jaw 15 after having passed the trip cam 17, closes and seizes the end of the yarn 9. The needle 14, 15 then commences to retreat for a predetermined distance and draws with it the yarn 9 and thereby measures a length $9^a$ of yarn.

The needle 14, 15 is carried in a support 19, which is actuated in one direction by a slotted bell-crank lever 20, suitably pivoted at 21 upon the carriage 11 and this bell-crank lever is operated in one direction by a screwed stud 22 on a transverse carriage 23 the actuation in the other direction being by a spring 24 connected to a bracket 25 fixed to the carriage 11 or equivalent. The transverse carriage slides on guides 26. The adjustment for length of draw can be governed by the screwed stud 22 and the provision of an adjustable stop 209 at the rear of the slide 19, the trip cam 17 and the tube or sleeve 10 with the blades 38 and 39 and also a stop 203 being correspondingly adjusted to a position which suits the changed length of traverse of the needle 14, 15. The transverse slide is actuated in a manner which will be hereinafter described.

The next operation is to stab the measured length $9^a$ of yarn into a pair of jaws 27 carried on a bar or spindle 28 or otherwise, and this is done by a chisel-like plunger 29 oscillatable vertically. The plunger 29 is carried on a lever arm 30 extending laterally from back to front of the machine and is pivoted at 31 on an extension 32 of the main longitudinal carriage 11 and worked by a cam nose 33 on a large spur wheel 34 rotatably mounted on the bracket 32. The jaw 27 may consist of two elements, one movable against the action of a spring 35. The spindle 28 is mounted between arms 36 which are fixed to a shaft 37 oscillatably mounted on the carriage 11.

At the same time that the plunger 29 stabs the yarn $9^a$ into the above mentioned jaws 27 the measured length $9^a$ of yarn is severed by a cutting device, for example, a scissors combination consisting of a fixed blade 38 and a movable blade 39. The latter is mounted on an arm 40 pivotally mounted at 41 on a bracket 42 fixed to the carriage 11 and actuated by a cam bowl 43 mounted on one limb of a lever combination 44 fulcrumed at 45 to a bracket 46 fixed to the carriage 11, the other lever arm 44 having a projection 47 which is acted upon in one direction by the arm 30 and in the other direction by a finger 48 fixed to the lever arm 30. The scissors are opened by suitable spring means, for example a compression spring 200, Figures 1 and 7, seated on the bracket 42 and acting on a stud 201 fixed to the arm 40.

The needle 14, 15 which has drawn the measured length $9^a$ of yarn through the sleeve 10 is now opened, and this is effected by a lever 49 pivoted at 50 and connecting rod 51 worked by a bell-cranked lever 52 fulcrumed at 53 from a connecting rod 54 which is adjustable and pivoted at 55 to the lever arm 30.

A compression spring 56 is fitted in connection with the connecting rod 54 to allow of the pivoted lever 49 safely encountering the adjustable stop 203, Figures 1 and 6, which defines its finishing position.

The stabbing of the now severed length $9^a$ of yarn carries the U loop formed down through the jaws 27 to a position just below a transverse needle 57, 58. This done, the chisel-like plunger springs up out of the way, leaving the two ends held in the jaws 27. Before receding, the plunger 29 has forced the loop downwards until its closed end has impinged on a concave platform 59 provided on the end of an arm 60 which is oscillatably mounted at 61 on the carriage 11, thereby forcing the platform and arm 60 downwards with it. A spring 62 tends to lift the arm 60 upwards and the needle 57, 58 by bearing against its upper side prevents lifting thereof beyond a point where the closed end of the loop can come into contact with and force down the platform under the action of the plunger 29. As the plunger 29 is raised the platform 59 follows it until the arm 60 is stopped by the needle 57, 58 by which time the platform has forced the closed end of the loop upwards and thereby opened out the lower part of the loop ready for the needle 57, 58 to pass through. The needle 57, 58 then enters the opened part of the loop and this transverse needle consists of a rigid element 57 and a pivoted gripping element 58. The transverse needle passes through the canvas 1 disposed over the notched bar 5 and right through the notch 6, and, at the same time, the gripping jaws 27 move angularly or downwards, see Figure 14, the downward movement being due to a connecting rod 63 connected to a lever 64 pivoted at 65 to the carriage 11 and having a cam face 66 acted on by a stop on the carriage 23, when the carriage 23 advances the needle 57, 58, and is returned to its normal position by the action of a spring 67 connected to the carriage 11 and one of the arms 36, when the carriage 23 withdraws. Any tendency of the yarn to slip out of the jaws 27 on the downward movement thereof is prevented by a pin 175 which has one end attached to the non-yielding jaw and loosely projects with its other end through a hole in the yielding jaw. At the same time the spindle 37 is moved slightly side-ways or longitudinally by a cam 68 which works against a projection 69 on the carriage 11 the side movement being requisite to dispose the transverse needle 57, 58 to one side of the outer end of the loop of yarn. The spindle is returned to its normal position by a spring 70, when the jaws 27 return upwards to the initial position. The disposition of the needle 57, 58 is now through the loop, and to the side of the turned down or outer end of the loop, the centre of the length being held above the bar by a pair of claws 71, see particularly Figure 16, provided with a shank 204 fixed to the carriage 11. One of the claws 71 is fixed and the other is arranged to yield relative to the fixed claw against the action of a spring 172. The transverse needle 57, 58 continues its advance, and opens, and is able to embrace the two sides of the loop.

The transverse needle 57, 58 is closed by a spring 205, see Figure 17 and opened positively by means which will be hereinafter described. When it reaches the end of its forward traverse, it closes and seizes the two sides of the loop near the ends of the yarn 9ᵃ and draws same from the gripping jaws 27 and pulls same through the canvas and then through the loop and finally from between the claws 71. This has the effect of knotting or tieing or threading the ends through the loop of yarn 9ᵃ and firmly in the canvas and leaving the two free ends to form the pile of the rug (see Figure 15). The needle 57, 58 continues to retreat and after pulling the loop firm and tight, finally releases the yarn 9ᵃ. The means for positively opening the part 58 of the transverse needle 57, 58 consists of a bar 72 Figure 1 pivoted at 73 on the transverse carriage 23 the bar 72 being arranged to act on the rearward extension 206, Figure 17, of the part 58 which is pivoted at 207 to the part 57, acted upon by a small pivoted cam or trip 74 Figure 1 horizontally or otherwise disposed and operating the bar 72 through the medium of a finger 210 provided on the bar 72, whilst the needle is finally opened by a fixed adjustable cam 75 co-operating with the finger 210 provided on the bar 72. This completes the insertion of one loop. The transverse carriage 23 it may be stated here is actuated by a connecting rod 76 from the spur wheel 34.

The next operation is to traverse the loop inserting mechanism a notch or the pitch distance along the notched bar 5, and this is done by traversing the carriage 11 in the following manner.

On the base of the transverse carriage 23 is a wedge shaped plate 77, Figure 8, which bears against two bowls 78 applied to two levers 79 fulcrumed on the carriage 11 towards the front of the machine. These levers 79 are horizontally disposed and they bear against studs 80 fixed in levers 81 which are approximately vertical, the levers 81 being pulled towards each other by a spring 82 and carrying pawls 83, 84 one on either side of the transverse carriage 23. The pawls 83, 84 rest simultaneously on one of two longitudinally arranged racks 85, 86 respectively having oppositely disposed teeth. In Figure 8 a portion of the rack 85 is shown broken off to expose the rack 86. When the transverse carriage 23 moves backwards, on the completion of the insertion of a loop, the wedge plate 77 acts through the pivoted levers 80 and 81 on the pawls 83 and 84 and pushes the longitudinal carriage 11 end-on to the extent of a tooth. The displacement of the carriage taken place owing to the nose of the pawl 83 bedding in a tooth of the rack 85 whilst the pawl 84 slides over the teeth of the rack 85. Therefore under pressure from the wedge plate 77, the longitudinal carriage 11 must move towards the left-hand of Figure 8 to the extent of one tooth which is equivalent to the extent of the pitch of the notches in the front notch plate 6. The purpose of the rack 86 is to serve when the longitudinal carriage 11 is to move in the other direction as will be hereinafter explained.

A positioning device is requisite to ensure the exact registering of the transverse needle 57, 58 with its particular notch, and this may consist of ball recesses 88 accurately pitched apart, and provided in the top of the front guide rail 13. A ball 89 on the carriage 11 works in connection therewith. When the transverse carriage 23 moves back, it releases a lever 90 which during insertion of a loop presses on the ball 89 under the action thereon of the front lower edge of the plate 77. On release of the lever 90 it permits of longitudinal movement of the carriage 11, whilst when the transverse carriage 23 moves forward with the transverse needle 57, 58 it acts on the lever 90 to hold the ball in its particular recess and so lock the carriage 11 with the transverse carriage 23 in exact register.

When the loops have been inserted to the desired width of the rug a reversal of the carriage 11 is necessary as is obvious, and this is arranged for at any width by the attachment of adjustable dummy teeth 91, 92 in the form of clamps on the racks 85 and 86 respectively which make up the particular rack tooth section to produce blanks wherever the dummy teeth are set. When the transverse carriage 23 advances for the last time during a complete traverse a projection 93 from the transverse carriage 23 rides past an adjustable finger 94 fixed on a top shaft 95 and gets in front thereof. When the transverse carriage 23 moves back it acts on the finger 94 and moves the shaft and at the same time owing to the presence of the dummy teeth 91 and 92 respectively the longitudinal carriage 11 is not moved by the pawls 83 and 84 respectively. This ensures that the next row of loops shall be correctly inserted in equal number and absolutely alignable.

When the top shaft 95 is actuated, it pulls on a connection 96 to a fulcrumed lever 97 and raises a pin 98 on one end of the lever 97 which works to a cam 99 in connection with the part 102 of a double clutch combination 100, 101, 102. It also lowers the other end of the lever 97 below a spring pressed nosed lever 103 or latch and the lever 97 also acts through an adjustable pin 104 on a pivoted lever 105 to disengage the part 100 of the clutch combination 100, 101, 102 by the action of a pin 107 provided on the lever 105 and acting on the cam 106. The part is fixed to a shaft 108 located in a continuous manner from a driving shaft 109 through toothed gear 110. The cam 106 is fixed to the part 100 which is rotatably and slidably mounted on the shaft 108, a spring 111 being provided to tend to retain the part 100 in engagement with the part 101. The cam 99 is fixed to the part 102 which is slidably mounted on a sleeve 115 rotating in a bracket 173 and supporting the shaft 108 which rotates freely in the sleeve, a spring 112 being provided which tends to retain the part 102 in engagement with the part 101. A pinion wheel 113 is fixed to the cam 106 and a gear wheel 114 is rigidly connected mounted on the sleeve 115. The gear wheel 114 meshes with a pinion 116 fixed on a shaft 117 provided with an elongated pinion 118 meshing with the wheel 34.

The hereinbefore described action of the shaft 95 results in engagement of the part 100 with, and disengagement of the part 102 from the driving part 101. Disengagement of the part 102 results in a stoppage of the wheel 114 and the drive of the wheel 34 thus remains out of action whilst a large spur wheel 119 fixed on a short shaft 120 and meshing with a pinion, 113, makes a half revolution. When the spur wheel 119 has made half a revolution one of two pins 121 thereon, by impinging against an arm 122 on a shaft 123 carrying the lever 103 trips the nosed lever or latch 103, thereby releases the lever 97 which returns to its initial position, and allows the spring 112 to re-engage the part 99, thereby re-establishing the drive of the carriage 23. At the same time the lever 97 releases the lever 105 and allows a spring to move the lever into action, thereby causing the part 100 to become disengaged against the action of the spring 111. Whilst the wheel 119 was making its half revolution it effected movement of the two rack bars 85 and 86 that is to say it brought the rack bar 85 out of and the rack bar 86 into register with the pawls 83 and 84. This movement is obtained by carrying the rack bars 85 and 86 on lever arms 125 fixed to a shaft 126 mounted in bearings 127 and providing a crank pin 128 on the end of the shaft 120 to engage a slot 129 in one of the arms 125. The carriage 11 is now caused to travel in opposite direction by the action of the pawls on the rack bar 86. The shaft 95 is returned to its normal position by a spring 133.

In order to lift the completed line of loops out of the notches in the notched bar and present a fresh part of the canvas to the needle 57, 58 before the carriage 23 again moves we provide automatic mechanism. This may consist of the edged slide bar 4 which is mounted in juxta-position to the notched bar 5 and is guided by vertical spindles 130 (one at each end) such spindles being pivotally connected at 131 to lever arms 132 on a longitudinal shaft 134. On the end of the longitudinal shaft 134 is a two armed lever 135, Figure 3. One arm has a bit 136 fixed upon it and is acted upon by a cam 137 on the shaft 120. The cam 137 has two depressions in its surface and when the bit 136 is forced by rotation of the cam out of either of these depressions, the two armed lever 135 turns the shaft 134 and arms 131 to raise the spindles 130 and slide bar 4. The slide bar 4 thus lifts the canvas until the last produced row of loops of yarn is raised clear of the notches 6. At the same time the two armed lever 135 is raised against the action of a spring 138 and operates to lift a peg 139 on a lever 140 connected by a link 141 to the lever 135 out of one of a series of notches 142 in a wheel 143 on the shaft of the sand roller 3 over which the canvas passes. Thus the roller 3 is free to rotate. At the same time the take-up mechanism is actuated which take-up mechanism may consist of a roller or rollers 144 through which the canvas passes after leaving the bar 5. The manner of its working can be as follows.

Figure 5:
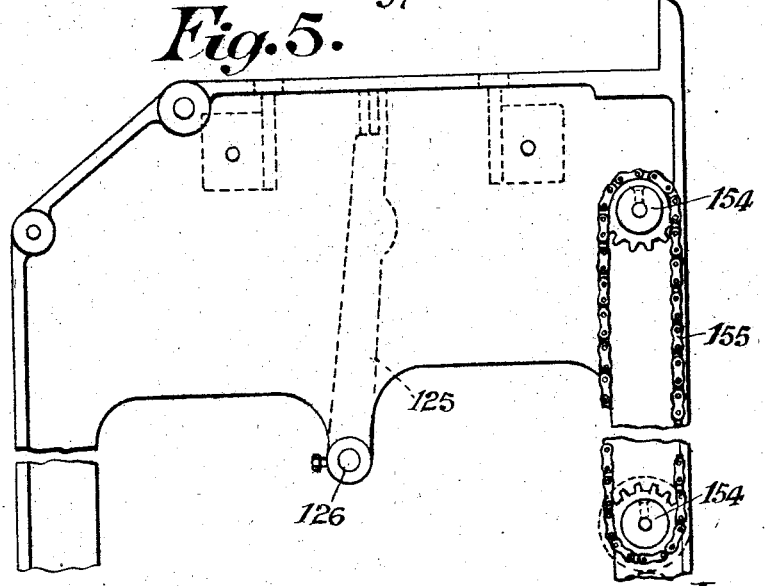
Figure 5 is a detached elevation of a portion of the machine regarded from the other end thereof.

We provide on the shaft 120 a cam 145 with two breaks and two enlargements thereon and such enlargements act on a bell-crank lever 146 held up by a spring 147 the lever 146 having a bowl for the cam 145 to bear on. The lever 146 is jointed by a link 148 to a further lever 149 pivoted at 151 which has a pawl 150 and works a ratchet wheel 152 on one of the batching rollers 144, a check pawl 153 being also provided. Thus, during a half revolution of the wheel 119, elevation and disengagement of the line of loops occurs and a feed of the finished rug to the extent of the distance the line of loops is effected. The sand roller 3 and the taking-up rollers 144 are connected together at the opposite end by sprocket wheels 154 and a slack chain 155, see Figure 5. It is to be understood that the change-over of the driving gear for the longitudinally moving carriage 11, the movement of the rack bars 85, 86, the elevation and disengagement of line of loops and the feed of the canvas all take place during a half revolution of the large spur wheel 119.

The drive may be from the small counter-shaft 109, Figure 2, or other driven part and such counter-shaft may drive through a small pinion a larger pinion on the clutch shaft 108. The counter-shaft 109 is shown as having fast and loose pulleys 156 and a strap lever 157 adapted to be controlled by means of a longitudinally swinging bar 158 from any part of the front of the apparatus.

As the transverse carriage 23 and the longitudinally moving carriage 11 are traversed it is obvious that the spur pinion 34 is always in gear with the elongated pinion 118 the teeth of the latter exceeding the length the carriage 11 traverses. The use of this elongated pinion is considered an important matter as we find slipfeather and groove devices do not work well.

By our apparatus we produce a perfectly automatic mechanism which will produce rugs or mats of various lengths or widths within the range of the machine and in which the yarn is fed, measured cut-off inserted and knotted or looped and the change over, and take-up is properly provided for as above indicated.

By providing a long bed, we may arrange to work two or more carriages upon the same, that is have one carriage to work a portion of the width and another carriage another portion, but this is only an extension of apparatus above indicated.

In Figure 9 we have illustrated an alternative construction of means for actuating the yarn feed needle 14, 15, in which the slide 19 is moved positively in both directions by means of a slotted lever 159 mounted at 160 on the carriage 11 by a vertical pivot and provided with a bowl 161 engaging the slot 162 of a positive cam 163. The cam 163 is fixed on a short shaft 164 journalled in bearings provided on the carriage 11 and is driven from the pinion 118 by suitable gearings. Alternatively the cam 163 may be fixed to the shaft which carries the gear wheel 34, the said shaft being extended for the purpose.

In Figure 10 we have illustrated another method of operating the yarn cutting means in which the oscillatable blade 39 of the scissors 38, 39 is connected by a link 165 to a lever 166 pivoted at 167 to a bracket 168 fixed on the carriage 11. A disc 169 is provided on a shaft 174 mounted in the bracket 168 and is connected to the wheel 34 by the crank pin which connects the rod 76 to the wheel 34. The disc 169 has fixed to it a crank pin 170 carrying an antifriction roller and adapted to oscillate the lever 166 in one direction and thereby actuate the blade 39 to cut the yarn. The lever 166 and blade 39 are returned to their initial position by a spring 171.

We desire it to be understood that we believe automatic apparatus is entirely new for the production of yarn rugs and such like wherein the yarn is knotted and that we therefore do not limit our claims to the construction hereinbefore stated of mechanism as there are other constructions serving the same purpose which fall within the spirit of our invention.

Amongst other articles, yarn rugs, mats, carpets, bed covers, chair or couch backs, and so forth may be provided by our apparatus.

We claim:—

1. An apparatus for making yarn rugs and such like comprising supporting means for supporting the foundation where the yarn is to be applied, feed means for moving the foundation, means for holding the yarn in a continuous form, measuring means for measuring and bringing into position a part of the yarn, cutting means for dividing the said part from the yarn, bending means for bending the said part into a loop, gripping means for holding the ends of the said part, actuating means for displacing the gripping means to bend the loop, actuating means for displacing one portion of the loop relatively to the other portion, a needle for penetrating the foundation and engaging the said loop needle actuating means for pushing the needle through one portion of the loop and the foundation and then withdrawing it from the foundation and gripping means on the said needle actuated to grip a part of the loop before the needle is withdrawn whereby the yarn is automatically cut to the desired length, attached to the foundation and knotted.

2. An apparatus according to claim 1, wherein a mechanism is provided for opening one part of the loop to facilitate the passage of the needle therethrough.

3. An apparatus according to claim 1, wherein means is provided for loosely retaining the yarn loop in position at one point when the loop is bent.

4. An apparatus for making yarn rugs and such like, comprising supporting means for supporting the foundation where the yarn is to be applied, feed means for moving the foundation, means for holding the yarn in a continuous form, measuring means for measuring and bringing into position a part of the yarn, cutting means for separating the said part from the yarn, bending means for bending the said part into a loop, gripping means for holding the ends of the said part, actuating means for displacing the gripping means to bend the loop, actuating means for displacing one portion of the loop relatively to the other portion, a yarn attaching needle for engaging the said loop and gripping a part thereof, a laterally reciprocatory carriage carrying the said needle, a longitudinally traversable carriage carrying the first named carriage, and a ratchet rack mechanism for producing an intermittent displacement of the second named carriage from the lateral movement of the first named carriage and thereby causing the said needle to act on different parts of the foundation.

5. An apparatus according to claim 4 wherein the ratchet rack mechanism comprises two ratchet-toothed racks co-operating alternately with pawls on the second named carriage operated by means on the first named carriage, the said racks having their teeth pointing in opposite directions and being intermittently brought into action by a mechanism arranged to be set in motion by the movement of the first named slide after the second named slide has moved a predetermined distance in either direction whereby the movement of the second named carriage is reversed when the needle or one of the needles has reached the edge of the foundation.

6. An apparatus according to claim 4 wherein the said ratchet rack mechanism is operatively connected to means for feeding the foundation, whereby the foundation is intermittently fed to present a fresh part to the needle or needles when the movement of the second named carriage is reversed.

7. An apparatus according to claim 4 wherein the said ratchet rack mechanism controls the transverse movement of the first named carriage by causing the said movement to be continuous until the second named carriage is reversed and stopping the first named carriage whilst effecting reversal of the second named carriage.

8. An apparatus according to claim 4 wherein the said ratchet rack mechanism comprises a clutch combination composed of three parts, one of which is continuously driven and the second and third of which are intermittently driven by the first part, the second part being geared to a shaft connected to two ratchet racks to oscillate them and the third part being operatively connected to the first named carriage to reciprocate it, lever means being provided to move the second and third parts alternately out of action and said lever means being moved into operative position by oscillatory means actuated by the movement of the first named carriage at the end of each predetermined traverse of the second named carriage and being released from the operative position by means operated from the second part after a predetermined degree of movement of the second part.

9. An apparatus for making yarn rugs and such like, comprising a notched bar for supporting the foundation in a folded over state, plunger means for folding the yarn into a loop, a pair of movable relatively yielding jaws for receiving the loop between them and holding the ends thereof together, a pair of stationary yielding claws for engaging the loop between them and supporting a portion of the loop above the bar, a movable platform for lifting the closed end of the loop and thereby causing the sides thereof to gape apart, an actuating mechanism for moving the pair of jaws into a position where the gripped ends of the loop lie approximately level with the closed end thereof but are disposed at the opposite side of the bar to the said closed end and out of register with the vertical centre line of the said end, a reciprocatory piercing needle for engaging the closed end of the loop and penetrating the foundation, a movable finger on the needle for gripping the ends of the loop between it and the needle, actuating means for withdrawing the said needle from the foundation and loop whilst the said ends remain gripped between the finger and the needle, and finger actuating means for releasing the said ends from between the finger and the needle.

10. An apparatus for making yarn rugs and such like, comprising a holder provided for the yarn to pass through in continuous form; means on the holder for allowing yarn to slip through it in one direction only; a reciprocatory gripping device for gripping the end of the yarn and drawing a predetermined length thereof through the holder, automatic severing means on the holder for cutting off the length of yarn drawn through the holder; and automatic attaching and knotting means for attaching the cut length of yarn to a foundation and forming a knot in the piece.

11. An apparatus according to claim 9 wherein all the mechanical parts referred to therein are carried by a carriage adapted to be mechanically moved to and fro between the edges of the foundation, the said needle mechanism being carried by an auxiliary carriage reciprocated on the main carriage at right angles to the movement of the main carriage by a connecting rod connected to a gear wheel meshing with and moved longitudinally on an elongated spur wheel extending beyond both edges of the foundation.

Signed at Manchester, in the county of Lancaster, England.

WILLIAM FELTON.
CHARLES WILLBER.

Witnesses:
ALFRED BOSSHARDT,
EDITH LILIAN WOODWARD.